United States Patent [19]

Quinn

[11] Patent Number: 4,642,330

[45] Date of Patent: Feb. 10, 1987

[54] DISPERSANT SALTS

[75] Inventor: Robert E. Quinn, Cleveland, Ohio

[73] Assignee: The Lubrizol Corporation, Wickliffe, Ohio

[21] Appl. No.: 841,923

[22] Filed: Mar. 20, 1986

Related U.S. Application Data

[63] Continuation of Ser. No. 686,786, Dec. 27, 1984, abandoned.

[51] Int. Cl.$^4$ .............................................. C08G 69/26
[52] U.S. Cl. ................................ 528/335; 106/308 N; 252/34; 252/546
[58] Field of Search ............. 106/308 N; 252/34, 356, 252/357, 546; 528/335

[56] References Cited

U.S. PATENT DOCUMENTS

| | | | |
|---|---|---|---|
| 3,172,892 | 3/1965 | LeSuer et al. | 260/326.5 |
| 3,185,704 | 5/1965 | Kahn et al. | 260/326.3 |
| 3,452,002 | 6/1969 | Brasch | 260/239.3 |
| 3,502,677 | 3/1970 | LeSuer | 260/268 |
| 3,509,052 | 4/1970 | Murphy | 252/34.7 |
| 4,447,348 | 5/1984 | Forsberg | 252/75 |
| 4,448,703 | 5/1984 | Forsberg | 252/75 |

FOREIGN PATENT DOCUMENTS 51-1705 1/1976 Japan.
51-1706 1/1976 Japan.

*Primary Examiner*—Amelia B. Yarbrough
*Attorney, Agent, or Firm*—Karl Bozicevic; Denis A. Polyn; Forrest L. Collins

[57] ABSTRACT

Dispersant salt compositions are made by reacting phosphorus-free carboxylic solubilizers with sulfonic acid-free organic acids or mineral acids. The carboxylic solubilizer can be made by the reaction of a polycarboxylic acid acylating agent having at least one hydrocarbon-based substitutent of at least 8 to 500 carbon atoms with at least one poly(alkyleneamine). The dispersant salts have good thermal stability when mixed with a surfactant or a hydrophilic organic solvent. The compositions can be used with aqueous solutions to disperse various fillers including carbon black, as well as to solubilize various fluids.

13 Claims, No Drawings

DISPERSANT SALTS

This is a continuation of co-pending application Ser. No. 686,786 filed on Dec. 27, 1984, now abandoned.

TECHNICAL FIELD

The present invention relates to dispersable salts, generally containing a surfactant or a hydrophilic organic solvent, in an aqueous phase. More specifically, the salt is the reaction product of a sulfonic acid-free organic acid or a mineral acid with a polycarboxylic acid acylating agent having at least one hydrocarbon-based substituent of from about 8 to 500 carbon atoms thereon.

BACKGROUND OF THE INVENTION

U.S. Pat. No. 3,634,241 to Lowe relates to a composition, useful as a lubricating oil additive, obtained by first reacting a $C_{20}$–$C_{400}$ aliphatic hydrocarbon succinic acid or derivative thereof which is capable of forming carboximide bonds with a $C_2$–$C_{30}$, $N_2$–$N_{10}$ alkylene polyamine to form a carboximide, and then reacting the carboximide with a $C_{12}$–$C_{40}$ hydrocarbon sulfonic acid. The product is a sulfonate salt.

U.S. Pat. No. 3,725,434 to Elliott et al relates to the reaction product of polyalkylene amine sulfonic acids and an alkenylsuccinic anhydride/acid.

U.S. Pat. No. 3,185,704 to Kahn et al relates to preparing formamides of mono-alkenyl succinimides through a condensation reaction.

U.S. Pat. No. 3,452,002 to Brasch relates to an oil-soluble dispersant by the reaction of an aliphatic monocarboxylic acid, a dicarboxylic acid or a carboxylic acid anhydride with monomeric alkylene imine. An acid catalyst, for example, HCl can be used for the synthesis.

U.S. Pat. No. 3,390,086 to O'Halloran discloses reaction products from an alkenylsuccinic acid, polyalkyleneamine and a second acid. An amide is formed.

U.S. Pat. No. 3,352,788 to Conlisk relates to various types of detergents which act as liquid binders for activated carbon compositions.

U.S. Pat. No. 4,439,491 to Wilson relates to protecting graphite or carbon against oxidation by application of a wetting agent.

U.S. Pat. No. 3,948,784 to Krillic relates to a method of clarifying water-soluble lubricants used in industrial grinding and cutting using cationic polyelectrolytes.

U.S. Pat. Nos. 3,341,454; 3,522,177; and 3,801,504 relate the inclusion of a polyoxyalkylated phenol in a graphite-containing lubricant.

U.S. Pat. No. 3,509,052 to Murphy relates to improved lubricating compositions containing a dispersant which is a derivative of a substituted succinic acid where the substituent contains at least 50 aliphatic carbon atoms and a demulsifier.

U.S. Pat. No. 3,172,892 to LeSuer et al relates to a process for preparing an oil-soluble product useful as a dispersing agent in a lubricating composition, wherein the dispersant contains a substituted succinic acid or an anhydride therein.

U.S. Pat. No. 3,502,677 to LeSuer relates to nitrogen containing and phosphorus-containing succinic derivatives used as additives in lubricating compositions.

U.S. Pat. Nos. 4,447,348 and 4,448,703 relate to combinations of carboxylic solubilizers made by reacting N-(hydroxyl-substituted hydrocarbyl)amine with an acylating agent and containing surfactants therein.

The above prior art patents accordingly fail to teach or suggest an aqueous dispersible composition containing a dispersant salt and a surfactant or a hydrophilic organic solvent.

SUMMARY OF THE INVENTION

Accordingly, it is in aspect for the present invention to provide a dispersant salt composition having surfactants or water-soluble organic solvents therein which have good thermal stability and are soluble in aqueous phase.

It is a further aspect of the present invention to provide compositions as above, which are useful in dispersing carbon blacks, pigments, organic fillers, and the like in aqueous systems.

In general, a dispersant salt composition capable of dispersing in an aqueous phase comprises the reaction product of (A) and (B) wherein (A) is a mineral acid or a sulfonic acid-free organic acid, and (B) is a phosphorus-free carboxylic solubilizer, said solubilizer made by the reaction of (B1) at least one polycarboxylic acid acylating agent having at least one hydrocarbon-based substituent of at least 8 to about 500 carbon atoms with (B2) at least one poly(alkyleneamine) and wherein the dispersant salt composition includes at least one surfactant or a hydrophilic organic solvent.

DESCRIPTION OF THE PREFERRED EMBODIMENTS

According to the concepts of the present invention, the composition relates to dispersant salts of phosphorus-free carboxylic solubilizers. The salts are made by the reaction of the carboxylic solubilizers with various acids. Although such acids are usually water-soluble, such a requirement is not necessary in that the pertinent requirement is that the dispersant salt be dispersible in an aqueous phase. The acid can generally be any acid, organic or mineral capable of forming a substantially water-soluble dispersant salt. Examples of mineral acids include nitric acid, nitrous acid, sulfuric acid, sulfurous acid, phosphoric acid, phosphorous acid, hydrochloric acid, silicic acid, boric acid, perchloric acid, chloric acid, chlorous acid, hypochlorous acid, permanganic acid, chromic acid, dichromic acid, ortho-meta- and pyrophosphoric acid, hydrofluoric acid, hydrobromic acid, hydriodic acid, hydrosulfuric acid and the like with hydrochloric acid being preferred. The organic acids generally include poly- or monofunctional acids in order that they retain their water solubility. The sulfonic acid-free organic acids generally have 1 to 10 carbon atoms with 1 to 4 carbon atoms being preferred and can be saturated or unsaturated aliphatic or aromatic. Examples of carboxylic acids include aliphatic carboxylic acids such as formic, acetic, propionic, butyric, and the like. Dicarboxylic acids can also be utilized such as oxalic, malonic, succinic, and glutaric. Moreover, unsaturated carboxylic acid such as maleic can also be utilized. Generally acetic acid, and formic are preferred.

CARBOXYLIC ACID ACYLATING AGENT (B1)

The acylating agent used in making the solubilizers (B) of the present inventive combination are well known to those of skill in the art and have been found to be useful as additives for lubricants and fuels and as intermediates for preparing the same. See, for example, the following U.S. Patents which are hereby incorporated by reference for their disclosures relating to carboxylic acid acylating agents: Nos. 4,448,703; 4,447,348; 3,219,666; 3,272,746; 3,381,022; 3,254,025; 3,278,550; 3,288,714; 3,271,310; 3,373,111; 3,346,354; 3,272,743; 3,374,174; 3,307,928; and 3,394,179.

Generally, these carboxylic acid acylating agents are prepared by reacting an olefin polymer or chlorinated analog thereof with an unsaturated carboxylic acid or derivative thereof such as acrylic acid, fumaric acid, maleic anhydride and the like. Often they are polycarboxylic acylating agents such as hydrocarbyl-substituted succinic acids and anhydrides. These acylating agents have at least one hydrocarbyl-based substituent of about 8 to about 500 carbon atoms. Generally, the substituent has from 8 about to about 196 or 200 carbon atoms and desirably from about 8 to about 100 carbon atoms. As will be more fully explained hereinbelow, when the substituent has 30 carbon atoms or less, a surfactant or a water-soluble organic solvent is not required.

As used herein, the terms "hydrocarbon-based", "hydrocarbon-based substituent" and the like denote a substituent having a carbon atom directly attached to the remainder of the molecule and having predominantly hydrocarbyl character within the context of this invention. Such substituents include the following:

(1) hydrocarbon substituents, that is, aliphatic (e.g., alkyl or alkenyl), alicyclic (e.g., cycloalkyl, cycloalkenyl) substituents, aromatic-, aliphatic- and alicyclic-substituted aromatic nuclei and the like as well as cyclic substituents wherein the ring is completed through another portion of the molecule (that is, any two indicated substituents may together form an alicyclic radical);

(2) substituted hydrocarbon substituents, that is, those substituents containing non-hydrocarbon radicals which, in the context of this invention, do not alter the predominantly hydrocarbyl substituent; those skilled in the art will be aware of such radicals (e.g., halo (especially chloro and fluoro), alkoxyl, mercapto, alkylmercapto, nitro, nitroso, sulfoxy, etc.;

(3) hetero substituents, that is, substituents which will, while having predominantly hydrocarbyl character within the context of this invention, contain other than carbon present in a ring or chain otherwise composed of carbon atoms. Suitable heteroatoms will be apparent to those of skill in the art and include, for example, sulfur, oxygen, nitrogen and such substituents as e.g., pyridyl, furanyl, thiophenyl, imidazolyl, etc., are exemplary of these hetero substituents.

In general, no more than about three radicals or heteroatoms and preferably no more than one, will be present for each ten carbon atoms in the hydrocarbon-based substituents. Typically, there will be no such radicals or heteroatoms in the hydrocarbon-based substituent and it will, therefore, be purely hydrocarbyl.

In general, the hydrocarbon-based substituents present in the acylating agents used in this invention are free from acetylenic unsaturation; ethylenic unsaturation, when present will generally be such that there is no more than one ethylenic linkage present for every ten carbon-to-carbon bonds in the substituent. The substituents are often completely saturated and therefore contain no ethylenic unsaturation.

As noted above, the hydrocarbon-based substituents present in the acylating agents of this invention may be derived from olefin polymers or chlorinated analogs thereof. The olefin monomers from which the olefin polymers are derived are polymerizable olefins and monomers characterized by having one or more ethylenic unsaturated group. They can be monoolefinic monomers such as ethylene, propylene, butene-1, isobutene and octene-1 or polyolefinic monomers (usually di-olefinic monomers such as butadiene-1,3 and isoprene). Usually these monomers are terminal olefins, that is, olefins characterized by the presence of the group $>C=CH_2$. However, certain internal olefins can also serve as monomers (these are sometimes referred to as medial olefins). When such medial olefin monomers are used, they normally are employed in combination with terminal olefins to produce olefin polymers which are interpolymers. Although the hydrocarbyl-based substituents may also include aromatic groups (especially phenyl groups) and alicyclic groups such as would be obtained from polymerizable cyclic olefins or alicyclic-substituted polymerizable cyclic olefins. The olefin polymers are usually free from such groups. Nevertheless, olefin polymers derived from such interpolymers of both 1,3-dienes and styrenes such as butadiene-1,3 and styrene or para (tertiary butyl) styrene are exceptions to this general rule.

Generally the olefin polymers are homo- or interpolymers of terminal hydrocarbyl olefins of about 2 to about 16 carbon atoms. A more typical class of olefin polymers is selected from that group consisting of homo- and interpolymers of terminal olefins of 2 to 6 carbon atoms, especially those of 2 to 4 carbon atoms.

Specific examples of terminal and medial olefin monomers which can be used to prepare the olefin polymers from which the hydrocarbon-based substituents are derived include ethylene, propylene, butene-1, butene-2, isobutene, pentene-1, hexene-1, heptene-1, octene-1, nonene-1, decene-1, pentene-2, propylene tetramer, diisobutylene, isobytylene trimer, butadiene-1,2, butadiene-1,3, pentadiene-1,2, pentadiene-1,3, isoprene, hexadiene-1,5, 2-chlorobutadiene-1,3, 2-methyl-heptene-1, 3-cyclohexylbutene-1, 3,3-dimethylpentene-1, styrenedivinylbenzene, vinylacetate allyl alcohol, 1-methylvinylacetate, acrylonitrile, ethylacrylate, ethylvinylether and methylvinylketone. Of these, the purely hydrocarbyl monomers are more typical and the terminal olefin monomers are especially typical.

Often the olefin polymers are poly(isobutene)s such as obtained by polymerization of a $C_4$ refinery stream having a butene content of about 35 to about 75 percent by weight and an isobutene content of about 30 to about 60 percent by weight in the presence of a Lewis acid catalyst such as aluminum chloride or boron trifluoride. These polyisobutenes contain predominantly (that is, greater than 80% of the total repeat units) isobutene repeat units of the configuration

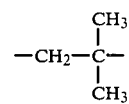

Typically, the hydrocarbyl-based substituent in the carboxylic acid acylating agent as used in the present invention is a hydrocarbyl, alkyl or alkenyl group of about 8 to about 500 carbon atoms which can be represented by the indicia "hyd". Useful acylating agents include substituted succinic acid agents containing hydrocarbyl-based substituents of about 8–100 carbon atoms.

Often the agents (B1) used in making the solubilizers (B) are substituted succinic acids or derivatives thereof which can be represented by the formula:

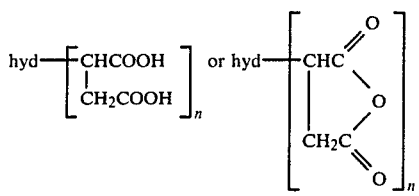

where n is an integer of from 1 to 4.0, and preferably is 1. Such succinic acid acylating agents can be made by the reaction of maleic anhydride, maleic acid, or fumaric acid with the aforedescribed olefin polymer, as is shown in the patents cited above. Generally, the reaction involves merely heating the two reactants at a temperature of about 150° to about 200° C. Mixtures of the aforesaid polymeric olefins, as well as mixtures of unsaturated mono- and dicarboxylic acids can also be used.

POLY(ALKYLENEAMINE) (B2)

The B1 acylating agents are reacted with (B2) poly(alkyleneamine)s to produce the carboxylic solubilizer (B). Oftentime, the B1 acylating agent is coupled via the poly(alkyleneamine) compounds. In any event, it is an important requirement that the reacted product, that is, the carboxylic solubilizer (B) contains at least one free amine therein. By "free amine" it is meant that the amine group has a hydrogen thereon which can be displaced.

The polyamines from which the (B) products of this invention are derived include principally alkylene amines conforming for the most part to the formula

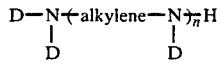

wherein n is an integer preferably from 1 to about 10, D is a hydrogen or a substantially hydrocarbon preferably having up to about 30 carbon atoms, and the "alkylene" group is preferably a lower alkylene group having 10 or less carbon atoms. The alkylene amines include principally methylene amines, ethylene amines, butylene amines, propylene amines, pentylene amines, hexylene amines, heptylene amines, octylene amines, other polymethylene amines, and also the cyclic and the higher homologues of such amines such as piperazines and aminoalkyl-substituted piperazines. They are exemplified specifically by: ethylene diamine, triethylene tetramine, propylene diamine, decamethylene diamine, octamethylene diamine, di(heptamethylene) triamine, tripropylene tetramine, tetraethkylene pentamine, trimethylene diamine, pentaethylene hexamine, di(trimethylene)triamine, 2-heptyl-3-(2-aminopropyl)imidazoline, 4-methyl-imidazoline, 1,3-bis(2-aminoethyl)imidazoline, pyrimidine, 1-(2 aminopropyl)piperazine, 1,4-bis(2-aminoethyl)piperazine, and 2-methyl-1-(2-aminobutyl)piperazine. Higher homologues such as are obtained by condenssing two or more of the above-illustrated alkylene amines likewise are useful. In lieu of the above amines, mixtures of two or more are often utilized.

The ethylene amines are often used. They are described in some detail under the heading "Ethylene Amines" in Encylcopedia of Chemical Technology, Kirk and Othmer, volume 5, pages 898-905, Interscience Publishers, New York (1950). Such compounds are prepared most conveniently by the reaction of an alkylene chloride with ammonia. The reaction results in the production of somewhat complex mixtures of alkylene amines, including cyclic condensation products such as piperazines. These mixtures find use in the process of this invention. On the other hand, quite satisfactory products may be obtained also by the use of pure alkylene amines. An especially useful alkylene amine for reasons of economy as well as effectiveness of the products derived therefrom is a mixture of ethylene amines prepared by the reaction of ethylene chloride and ammonia and having a composition which corresponds to that of tetraethylene pentamine.

Higher homologues such as are obtained by condensation of the above illustrated alkylene amines through amino radicals are likewise useful. It will be appreciated that condensation through amino radicals results in a higher amine accompanied with removal of ammonia.

REACTION OF ACYLATING AGENT (B1) WITH THE POLY(ALKYLENEAMINE) (B2) TO FORM THE CARBOXYLIC SOLIBULIZER (B)

The reaction of the acylating agent (B1) with the poly(alkyleneamine) (B2) is generally carried out at a temperature of about 80° C. to the decomposition temperature of the reaction compounds and/or products having the lowest such temperature. Typically, the reaction temperature is from 100° C. to about 300° C. and preferably from about 125° C. to about 250° C. Mixtures of acylating agents are often utilized.

Generally, the ratio of acylating agent to the poly(alkyleneamine) is from about 0.33 to 1.3 equivalents (B1) acylating agent per equivalent of (B2) amine. An equivalent of acylating agent (B1) can be determined by dividing its molecular weight on the number of carboxyl functions present. For example, a succinic acid anhydride or di(alkyl)ester acylating agent has an equivalent weight of one-half its molecular weight. An equivalent of amine is the amount of the (B2) amine corresponding to the total weight of amine divided by the total number of nitrogens present.

In addition to the acylating agent (B1) there can also be present in the solubilizer-forming reaction mixture one or more lower molecular weight mono- or polycarboxylic acid acylating agents of 1 to about less than 18 carbons such as fatty acids having 10 to about 18 carbon atoms or a tetrapropenyl-substituted succinic anhydride. In such cases the moles of lower acylating agent present will be at least less than those of the acylating agent (B1) and the total equivalents of lower acylating agent plus acylating agent (B1) will still fall within the aforedescribed ratios.

Typical lower (MW) monocarboxylic acylating agents include saturated and unsaturated fatty acids, such as lauric acid, stearic acid, oleic acids, myristic acid, linoleic acid, and the like. Anhydrides, when available, and lower alkyl esters of these acids also can be used. Mixtures of two or more such agents can also be successfully used. An extensive discussion of such acids is found in Kirk-Othmer "Encyclopedia of Claimed Technology" 2nd Edition, 1965, John Wiley & Sons, N.Y., pages 811-856. Acylating agents including acetic acid propionic acid, butyric acid, acrylic and benzoic acid as well as their anhydrides and lower alkyl esters.

Among the useful lower Mw polycarboxylic acylating agents are maleic acid, fumaric acid, itaconic acid, mesaconic acid, succinic acid, phthalic acid, alkyl-substituted phthalic acids, malonic acid, glutaric acid, adipic acid, citraconic acid, glutaconic acid, chloromaleic acid, ascorbic acid, etc. Again anhydrides, when available, and lower alkyl esters and esters of these acids can be used as lower Mw acylating agents.

Certain substituted succinic acid and anhydride lower Mw acylating agents can also be used. A number of these are discussed in the above-cited Kirk-Othmer article at pages 847-849. Such acylating agents can typically be represented by the formula:

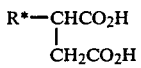

wherein R* is a $C_1$ to about a $C_{10}$ hydrocarbyl group. Preferably, R* is an aliphatic or alicyclic hydrocarbyl group less than 10% of its carbon-to-carbon bonds unsaturated. Examples of such groups are 4-butylcyclohexyl, di(isobutyl), decyl, etc. The production of such substituted succinic acids and their derivatives via alkylation of maleic acid or its derivatives with a halohydrocarbon is well known to those of skill in the art and need not be discussed in detail at this point.

Acid halides of the aforedescribed lower Mw mono- and polycarboxylic acids can be used as lower Mw acylating agents in this invention. These can be prepared by the reaction of such acids or their anhydrides with halogenating agents such as phosphorus tribromide, phosphorus pentachloride, phosphorus oxychloride, or thionyl chloride. Esters of such acids can be prepared simply by the reaction of the acid, acid halide or anhydride with an alcohol or phenolic compound. Particularly useful are the lower alkyl and alkenyl alcohols such as methanol, ethanol, allyl alcohol, propanol, cyclohexanol, etc. Esterification reactions are usually promoted by the use of alkaline catalysts such as sodium hydroxide or alkoxide, or an acidic catalyst such as sulfuric acid or toluene sulfonic acid.

REACTION OF ACID (A) WITH THE CARBOXYLIC SOLUBILIZER (B)

The dispersant salt composition is formed by the reaction of the acid (A) with the carboxylic solubilizer (B). Although the reaction can be carried out at room temperature, it is often desirable to heat the reactants to promote the reaction rate. Generally, a temperature from about 0° C. to about 150° C. desirably from about 15° to 100° C. and preferably from about 25° to 80° C. is utilized.

The amount of acid is generally not critical and excess amount of acids can be utilized. Generally, at least 0.5 equivalents of acid can be utilized per mole of said carboxylic solubilizer (B) with usually at least 1 equivalent of acid being utilized. The phosphorus-free carboxylic solubilizers are reacted through addition of a hydrogen atom on a free amine of the (B2) poly(alkyleneamine). The dispersant salt composition being the reaction product of (A) and (B) produces a salt which is dispersable in an aqueous phase. Usually the dispersant salt is almost infinitely dilutable in water.

SURFACTANT

The dispersant salts of the present invention are oftentimes utilized in association with a surfactant. Not only does the surfactant serve to reduce the viscosity of the salt dispersion composition, but also aids in dispersing or solubilizing any particles or fluids. The surfactant also generally imparts stability to the aqueous phase. Typically, at least 5 parts by weight of surfactant is utilized per 100 parts by weight of said dispersant salt composition in order to add stability to the system as well as to improve the water solubility of the dispersant salt with at least 20 parts by weight being desired. The amount of surfactant based upon a percentage can be from about 5% by weight to about 95% by weight.

The surfactant is usually hydrophilic and can be of the cationic, anionic, or non-ionic type. Many such surfactants of each type are known to the art. See, for example, McCutcheon's "Detergents and Emulsifiers", 1978, North American Edition, published by McCutcheon's Division, MC Publishing Corporation, Glen Rock, N.J., U.S.A., particularly pages 17-23 which are hereby incorporated by reference for their disclosures in this regard.

Of these surfactants, non-ionic surfactants are generally used. A number of non-ionic surfactant types are known. Among these are the alkylene oxide-treated products, such as ethylene oxide-treated phenols, alcohols, esters, amines and amides. Ethylene oxide/propylene oxide block copolymers are also useful non-ionic surfactants. Glycerol esters and sugar esters are also known to be non-ionic surfactants. A typical non-ionic surfactant class useful with the derivatives of the present invention are the alkylene oxide-treated alkyl phenols such as the ethylene oxide alkyl phenol condensates sold by the Rohm & Haas Company. A specific example of these is Triton X-100 which contains an average of 9-10 ethylene oxide units per molecule, has an HLB value of about 13.5 and a molecular weight of about 628. Many other suitable non-ionic surfactants are known; see, for example, the aforementioned McCutcheon's as well as the treatise "Non-ionic Surfactants" edited by Martin J. Schick, M. Drekker Co., New York, 1967, which is hereby incorporated by reference for its disclosure in this regard.

As noted above, cationic and anionic surfactants can also be used in combination with the solubilizers (A) in this invention. Generally, the surfactants are hydrophilic. Anionic surfactants containing negatively charged polar groups while cationic surfactants contain positively charged polar groups. A general survey of useful surfactants is found in Kirk-Othmer Encyclopedia of Chemical Technology, Second Edition, Volume 19, page 507 and following (1969, John Wiley and Son, New York) and the aforementioned compilation published under the name of McCutcheon's . These references are both hereby incorporated by reference to their disclosures relating to cationic, and anionic surfactants.

Among the useful anionic surfactant types are the widely known metal carboxylate soaps, organo sulfates, sulfonates, sulfocarboxylic acids and their salts, and phosphates. Useful cationic surfactants include nitrogen compounds such as amine oxides and the well known quaternary ammonium salts. Amphoteric surfactants include amino acid type materials and similar types. Various cationic and anionic dispersants are available from the industry, particularly from such companies as Rohm and Haas and Union Carbide Corporation, both of America. Further information about anionic and cationic surfactants also can be found in the texts "Anionic Surfactants", Parts II and III, edited by W. M.

Linfield, published by Marcel Dekker, Inc., N.Y. 1976 and "Cationic Surfactants", edited by E. Jungermann, Marcel Dekker, Inc., N.Y., 1976. Each of these references are incorporated by reference for their disclosure in this regard.

HYDROPHILIC ORGANIC SOLVENTS

In lieu of the surfactant, or in combination therewith, a hydrophilic organic solvent can be utilized. That is, instead of a surfactant to help stabilize the system, a hydrophilic organic solvent can be utilized. The amount of hydrophilic solvent utilized will generally vary with regard to the type of dispersant salt but generally is at least 5% by weight and desirably at least 10% by weight. Hydrophilic solvents are known to the art. Desirably, the solvent is an oxygenated solvent. One class of oxygenated solvents include the mono and dialkyl ethers of ethylene glycol and their derivatives. Specific examples include ethylene glycol monobutyl ether, ethylene glycol monobutyl ether acetate, ethylene glycol monoethyl ether acetate, ethylene glycol monoethyl ether, ethylene glycol dibutyl ether, ethylene glycol monohexyl ether, ethylene glycol monomethyl ether, ethylene glycol monomethyl ether acetate, and ethylene glycol monophenyl ether. These types of solvents are generally available under the tradename of Cellosolve and are made by the Union Carbide Corporation. Another class of oxygenated solvents are the various aliphatic alcohols such as allyl alcohol, and the various soluble alkanols having from 1 to about 4 carbon atoms such as methyl alcohol, ethyl alcohol, propyl alcohol, isopropyl alcohol, and tert-butyl alcohol. The ketones from another class of oxygenated solvants and thus, acetone and methyl ethyl ketone can be utilized. Also, the various soluble alcohols of ketones such as diacetone alcohol can be utilized. These and other types of hydrophilic organic solvents can be used in place of, or in combination with the various surfactants of the present invention.

According to further concepts of the present invention, when a (B1) acylating agent having a hydrocarbon-based substituent of from about 8 to about 30 carbon atoms, and desirably from about 8 to about 12 carbon atoms, no surfactant and no hydrophilic solvent is required. This is believed due to the fact that the hydrocarbon portion is easily dispersed as the hydrocarbon chain decreases in size. Thus, whenever the hydrocarbon substituent on the (B1) acylating is small, the dispersant salt composition need not contain any surfactant or hydrophilic organic solvent therein.

The dispersant salt composition of the present invention, whether or not containing a surfactant or a hydrophilic organic solvent can be utilized as neat, or contain an amount of water therein such that an invert emulsion or other system is formed wherein the water is in the discontinuous phase, or wherein the water forms a continuous phase. Naturally, the actual amount of water utilized to form an invert emulsion or form a continuous phase will vary depending upon the type of surfactant, the type of hydrophilic organic solvent, the type of dispersant salt, and the like. Oftentimes the type of solution formed depends upon the desired concentration in water, or the fact that no water at all is utilized.

PARTICLES AND FLUIDS

The dispersant salt composition in association with water keeps or maintains in solution various particles or fluids. Generally, any type of particle desired to be suspended, dispersed, or the like can be utilized. Examples include the various clays, various talcs, various types of coal, various types of sulfur, various types of silica, pigments, fillers, and fibers. The dispersant composition is especially suitable in suspending undesirable particles such as soot and especially carbon black soot. That is, during the manufacture of carbon black, soot is inexorably produced as a by-product. Heretofore, since it was virtually impossible to separate out the soot, it is generally slurried in a water solution of molasses or lignosulfonates and dried. However, during drying, the molasses or lignosulfonates would degrade and produce carbon black pellets which do not readily redisperse. According to the present invention, the carbon black soot can readily be dispersed by the dispersant salt composition. Upon drying, a non-dust, free flowing, highly dispersed carbon black composition is produced. Particles such as carbon black are generally highly desired in various products such as tires, roofing materials, pigments, and the like. Another type of particle is the fiber, often of a small size when it is desirable that they be suspended or dispersed in a solution. Thus, dispersant salt composition including the surfactant or organic hydrophilic solvent therein can be utilized in pulping operations whenever it is desirable to maintain cellulosic particles or plastics in solution. Examples of other fibers include glass, that is, fiberglass, polyester, nylon, carbon fibers, rayon, polypropylene, and the like. With regard to fluids, various liquids such as dyes, oils, and the like can be kept in solution. Moreover, various gases such as carbon dioxide, and the like can be kept in solutions such as in a foam.

Accordingly, the dispersant salt along with the optional surfactant or hydrophilic organic solvent can be utilized whenever it is desirable to disperse or maintain particles or fluids in an aqueous solution.

The invention will be better understood by reference to the following examples:

EXAMPLE 1

To a one liter vessel was added 240 grams of polyisobutenyl succinic tetraethylene pentamine, 12 grams of formic acid, and 64 grams of Triton X-100, a surfactant. The mixture was heated with stirring to approximately 85° C. Then, 444 grams of water was slowly added over a period of hours, as from about 2 to about 4 hours while maintaining the temperature at approximately 85° C. The mixture is then cooled to room temperature with stirring. The desired dispersant salt was obtained.

EXAMPLE 2

In a manner similar to Example 1, utilizing the same ingredients except for the acid which was concentrated hydrochloric acid, a desired dispersant salt was made. The amount of the carboxylic solubilizer was 150 grams, the amount of concentrated HCl was 13 grams, the amount of the surfactant was 40 grams and the amount of water added over a period of time was 178 grams.

EXAMPLE 3

In a manner similar to Example 1 except for the acid which was acetic acid, a desired dispersant salt was made. The amount of the carboxylic solubilizer was 600 grams, the amount of the acetic acid was 30 grams, the amount of the surfactant was 160 grams, and the amount of water added over a period of time was 1,110 grams.

EXAMPLE 4

In a manner similar to Example 1, a dispersant salt was made. In lieu of a surfactant, a hydrophilic or organic solvent was utilized. Specifically, 840 grams of the carboxylic solubilizer of Example 1, 420 grams of butyl cellosolve and 21 grams of acetic acid was utilized. These three components were heated to approximately 85° C. for a short period of time with mixing. The desired dispersant salt was obtained. Then, 15 grams of the salt was added to the vessel and 85 grams of water added thereto with mixing. A clear amber solution was obtained.

EXAMPLE 5

In a manner similar to Example, 1, 5 grams of the carboxylic solubilizer set forth in Example 1, 5 grams of butyl cellosolve and 1 gram of acetic acid were heated and mixed with 39 grams of water slowly added thereto. The desired dispersant salt was obtained. After 24 hours, the solution was still clear.

EXAMPLE 6

In a manner exactly identical to that of Example 5, having the same formulation except that 2.5 grams of acetic acid was utilized, a dispersant salt was made. The additional amount of acid still yield a clear solution which was still clear after 24 hours.

All of the above solutions of examples 1–6 had good stability in that after standing for at least one day, no noticeable separation of the ingredients occurred.

EXAMPLE 7

In a manner similar to Example 1, 5 grams of the carboxylic solubilizer set forth in Example 1, and 10 grams of Butyl Cellosolve were heated and mixed. No acid was utilized. Then 35 grams of tap water was added over a short period of time with continued heating. This solution was then allowed to cool. After 6 hours noticeable separation had occurred.

Thus, it is readily apparent that when an acid it not utilized, a suitable dispersant salt is not obtained.

The various dispersant salts set forth in Examples 1 through 6 was mixed with soot containing carbon black. The amount of the dispersant solution including the water was approximately 4% by weight with the amount of carbon black being approximately 96% by weight. After thoroughly mixing the ingredients, the mixture was dried at approximately 450° to about 500° F. The remaining carbon black mixture was a very fine size but did not contain any powder or dust therein. Moreover, it was free flowing. Thus, the highly dispersed carbon black system with regard to each of the dispersant salts was produced according to the present invention.

Although, as set forth above, the amount of water can vary over a wide range to form the aqueous system, oftentime the system will contain a small amount of water. Thus the aqueous system can contain at least 20% by weight of water, and more desirably at least 40% by weight. Hence, concentrated or water aqueous systems can be formed.

These concentrates and water-based aqueous systems can optionally include other conventional additives commonly employed in water-based functional fluids. These other additives include functional additives, corrosion-inhibitors, shear stabilizing agents, bactericides, dyes, water-softeners, odor masking agents, anti-foam agents, and the like.

The concentrates are analogous to the water-based functional fluids except that they contain less water and proportionately more of the other ingredients. The concentrates can be converted to water-based functional fluids by dilution with water. This dilution is usually done by standard mixing techniques. This is often a convenient procedure since the concentrate can be shipped to the point of use before additional water is added. Thus, the cost of shipping a substantial amount of the water in the final water-based functional fluid is saved. Only the water necessary to formulate the concentrate (which is determined primarily by ease of handling and convenience factors), need be shipped.

Also included within the invention are methods for preparing aqueous systems, including both concentrates and water-based functional fluids, containing other conventional additives commonly employed in water-based functional fluids. These methods comprise the steps of:

(1) mixing the composition of the invention with such other conventional additives either simultaneously or sequentially to form a dispersion or solution; optionally (2) combining said dispersion or solution with water to form said aqueous concentrate; and/or (3) diluting said dispersion or solution, or concentrate with water wherein the total amount of water used is in the amount required to provide the desired concentration of the composition of the invention and other functional additives in said concentrates or said water-based functional fluids.

These mixing steps are carried out using conventional equipment and generally at room or slightly elevated temperatures, usually below 100° C. and often below 50° C. As noted above, the concentrate can be formed and then shipped to the point of use where it is diluted with water to form the desired water-based functional fluid. In other instances the finished water-based functional fluid can be formed directly in the same equipment used to form the concentrate or the dispersion or solution.

The functional additives that can be used are typically oil-soluble, water-insoluble additives which function in conventional oil-based systems as E.P. agents, anti-wear agents, load-carrying agents, friction modifiers, lubricity agents, etc. They can also function as anti-slip agents, film formers and friction modifiers. As is well known, such additives can function in two or more of the above-mentioned ways; for example, E.P. agents often function as load-carrying agents.

The term "oil-soluble, water-insoluble functional additive" refers to a functional additive which is not soluble in water above a level of about 1 gram per 100 milliliters of water at 25°, but is soluble in mineral oil to the extent of at least 1 gram per liter at 25°.

These functional additives can also include certain solid lubricants such as graphite, molybdenum disulfide and polytetrafluoroethylene and related solid polymers.

These functional additives can also include frictional polymer formers. Briefly, these are potential polymer forming materials which are dispersed in a liquid carrier at low concentration and which polymerize at rubbing or contacting surfaces to form protective polymeric films on the surfaces. The polymerizations are believed to result from the heat generated by the rubbing and, possibly, from catalytic and/or chemical action of the freshly exposed surface. A specific example of such materials is dilinoleic acid and ethylene glycol combinations which can form a polyester frictional polymer film. These materials are known to the art and descriptions of them are found, for example, in the journal "Wear", Volume 26, pages 369–392, and West German Published Patent Application 2,339,065. These disclosures are hereby incorporated by reference for their discussions of frictional polymer formers.

Typically these functional additives are known metal or amine salts of organo sulfur, phosphorus, boron or carboxylic acids which are the same as or of the same type as used in oil-based fluids. Typically such salts are of carboxylic acids of 1 to 22 carbon atoms including both aromatic and aliphatic acids; sulfur acids such as alkyl and aromatic sulfonic acids and the like; phosphorus acids such as phosphoric acid, phosphorus acid, phosphinic acid, acid phosphate esters and analogous sulfur homologs such as the thiophosphoric and dithiophosphoric acid and related acid esters; boron acids include boric acid, acid borates and the like. Useful functional additives also include metal dithiocarbamates such as molybdenum and antimony dithiocarbamates; as well as dibutyl tin sulfide, tributyl tin oxide, phosphates and phosphites; borate amine salts, chlorinated waxes; trialkyl tin oxide, molybdenum phosphates, and chlorinated waxes.

Mainly such functional additives are known to the art. For example, descriptions of additives useful in conventional oil-based systems and in the aqueous systems of this invention are found in "Advances in Petroleum Chemistry and Refining", Volume 8, edited by John J. McKetta, Interscience Publishers, New York, 1963, pages 31–38 inclusive; Kirk-Othmer "Encyclopedia of Chemical Technology", Volume 12, Second Edition, Interscience Publishers, New York, 1967, page 575 et seq.; "Lubricant Additives" by M. W. Ranney, Noyes Data Corporation, Park Ridge, N.J., U.S.A., 1973; and "Lubricant Additives" by C. V. Smalheer and R. K. Smith, The Lezius-Hiles Co., Cleveland, Ohio, U.S.A. These references are hereby incorporated by reference for their disclosures of functional additives useful in the systems of this invention.

In certain of the typical aqueous systems of the invention, the functional additive is a sulfur or chloro-sulfur E.P. agent, known to be useful in oil-base systems. Such materials include chlorinated aliphatic hydrocarbons, such as chlorinated wax; organic sulfides and polysulfides, such as benzyldisulfide, bis-(chlorobenzyl)disulfide, dibutyl tetrasulfide, sulfurized sperm oil, sulfurized methyl ester of oleic acid, sulfurized alkylphenol, sulfurized dipentene, sulfurized terpene, and sulfurized Diels-Alder adducts; phosphosulfurized hydrocarbons, such as the reaction product of phosphorus sulfide with turpentine or methyl oleate; phosphorus esters such as the dihydrocarbon and trihydrocarbon phosphites, i.e., dibutyl phosphite, diheptyl phosphite, dicyclohexyl phosphite, pentylphenyl phosphite, dipentylphenyl phosphite, tridecyl phosphite, distearyl phosphite and polypropylene substituted phenol phosphite; metal thiocarbamates, such as zinc dioctyldithiocarbamate and barium heptylphenol dithiocarbamate; and Group II metal salts of phosphorodithioic acid, such as zinc dicyclohexyl phosphorodithioate, and the zinc salts of a phosphorodithioic acid.

The functional additive can also be a film former such as a synthetic or natural latex or emulsion thereof in water. Such latexes include natural rubber latexes and polystyrene butadienes synthetic latex.

The functional additive can also be an anti-chatter or anti-squawk agent. Examples of the former are the amide metal dithiophosphate combinations such as disclosed in West German Pat. No. 1,109,302; amine salt-azomethene combinations such as disclosed in British Patent Specification 893,977; or amine dithiophosphate such as disclosed in U.S. Pat. No. 3,002,014. Examples of anti-squawk agents are N-acyl-sarcosines and derivatives thereof such as disclosed in U.S. Pat. Nos. 3,156,652 and 3,156,653; sulfurized fatty acids and esters thereof such as disclosed in U.S. Pat. Nos. 2,913,415 and 2,982,734; and esters of dimerized fatty acids such as disclosed in U.S. Pat. No. 3,039,967. The above-cited patents are incorporated herein by reference for their disclosure as pertinent to anti-chatter and anti-squawk agents useful as a functional additive in the aqueous systems of the present invention.

Specific examples of functional additives useful in the aqueous systems of this invention include the following commercially available products.

TABLE I

| Functional Additive Tradename | Chemical Description | Supplier |
|---|---|---|
| Anglamol 32 | Chlorosulfurized hydrocarbon | Lubrizol[1] |
| Anglamol 75 | Zinc dialkyl phosphate | Lubrizol[1] |
| Molyvan L | A thiaphosphomolybdate | Vanderbilt[2] |
| Lubrizol-5315 | Sulfurized cyclic carboxylate ester | Lubrizol[1] |
| Emcol TS 230 | Acid phosphate ester | Witco[3] |

[1] The Lubrizol Corporation, Wickliffe, Ohio, U.S.A.
[2] R. T. Vanderbilt Company, Inc., New York, N.Y., U.S.A.
[3] Witco Chemical Corp., Organics Division, Houston, Texas, U.S.A.

Mixtures of two or more of any of the aforedescribed functional additives can also be used.

Typically, a functionally effective amount of the functional additive is present in the aqueous systems of this invention. For example, if the functional additive is intended to serve primarily as a load-carrying agent, it is present in a load-carrying amount.

The aqueous systems of this invention often contain at least one inhibitor for corrosion of metals. These inhibitors can prevent corrosion of either ferrous or non-ferrous metals (e.g., copper, bronze, brass, titanium, aluminum and the like) or both. The inhibitor can be organic or inorganic in nature. Usually it is sufficiently soluble in water to provide a satisfactory inhibiting action though it can function as a corrosion-inhibitor without dissolving in water, it need not be water-soluble. Many suitable inorganic inhibitors useful in the aqueous systems of the present invention are known to those skilled in the art. Included are those described in "Protective Coatings for Metals" by Burns and Bradley, Reinhold Publishing Corporation, Second Edition, Chapter 13, pages 596–605. This disclosure relative to inhibitors are hereby incorporated by reference. Specific examples of useful inorganic inhibitors include alkali metal nitrites, sodium di- and tripolyphosphate, potassium and dipotassium phosphate, alkali metal borate and mixtures of the same. Many suitable organic inhibitors are known to those of skill in the art. Specific examples include hydrocarbyl amine and hydroxy-substituted hydrocarbyl amine neutralized acid compound, such as neutralized phosphates and hydrocarbyl phosphate esters, neutralized fatty acids (e.g., those having about 8 to about 22 carbon atoms), neutralized aromatic carboxylic acids (e.g., 4-tertiarybutyl benzoic acid), neutralized naphthenic acids and neutralized hydrocarbyl sulfonates. Mixed salt esters of alkylated succinimides are also useful. Particularly useful amines include the alkanol amines such as ethanol amine, diethanol amine. Mixtures of two or more of any of the afore-described corrosion-inhibitors can also be used. The corrosion-inhibitor is usually present in concentrations in which they are effective in inhibiting corrosion of metals with which the aqueous composition comes in contact.

Certain of the aqueous systems of the present invention (particularly those that are used in cutting or shaping of metal) can also contain at least one polyol with inverse solubility in water. Such polyols are those that become less soluble as the temperature of the water increases. They thus can function as surface lubricity agents during cutting or working operations since, as the liquid is heated as a result of friction between a metal workpiece and worktool, the polyol of inverse solubility "plates out" on the surface of the workpiece, thus improving its lubricity characteristics.

The aqueous systems of the present invention can also include at least one bacteriocide. Such bacteriocides are well known to those of skill in the art and specific examples can be found in the aforementioned McCutcheon publication "Functional Materials" under the heading "Antimicrobials" on pages 9–20 thereof. This disclosure is hereby incorporated by reference as it relates to suitable bacteriocides for use in the aqueous compositions or systems of this invention. Generally, these bacteriocides are water-soluble, at least to the extent to allow them to function as bacteriocides.

The aqueous systems of the present invention can also include such other materials as dyes, e.g., an acid green dye; water softeners, e.g., ethylene diamine tetraacetate sodium salt or nitrilo triacetic acid; odor masking agents, e.g., citronella, oil of lemon, and the like; and anti-foamants, such as the well-known silicone anti-foamant agents.

The aqueous systems of this invention may also include an anti-freeze additive where it is desired to use the composition at a low temperature. Materials such as ethylene glycol and analogous polyoxyalkylene polyols can be used as anti-freeze agents. Clearly, the amount used will depend on the degree of anti-freeze protection desired and will be known to those of ordinary skill in the art.

It should also be noted that many of the ingredients described above for use in making the aqueous systems of this invention are industrial products which exhibit or confer more than one property on such aqueous systems. Thus, a single ingredient can provide several functions thereby eliminating or reducing the need for some other additional ingredient. Thus, for example, an E.P. agent such as tributyl tin oxide can also function as a bactericide.

While in accordance with the patent statutes, a best mode and preferred embodiment has been set forth, the scope of the invention is set forth by the scope of the attached claims.

What is claimed is:

1. An aqueous dispersion, comprising:
   water;
   a dispersant salt composition comprising the reaction product of an acid (A) and a solubilizer (B), wherein;
   (A) is a mineral acid or a sulfonic acid-free organic acid, and
   (B) is a phosphorus-free carboxylic solubilizer made by reacting (B1) and (B2) wherein (B1) is a polycarboxylic acid acylating agent having a hydrocarbon-based substituent containing more than 30 carbon atoms and (B2) is a poly(alkyleneamine); and
   an additional component selected from the group consisting of a surfactant and a hydrophilic organic solvent, the additional component being present in sufficient amount so as to impart stability to a continuous aqueous phase.

2. The aqueous dispersion of claim 1, wherein the additional component includes the surfactant in an amount of at least 5 parts by weight per 100 parts by weight of the dispersant salt composition.

3. The aqueous dispersion of claim 2, wherein the surfactant is a non-ionic surfactant having an HLB of about 13.5.

4. The aqueous dispersion as claimed in claim 1, wherein the additional component includes a hydrophilic organic solvent in an amount of at least 5% by weight based on the weight of the dispersant salt composition.

5. The aqueous dispersion as claimed in claim 4, wherein the hydrophilic organic solvent is an oxygenated hydrophilic organic solvent present in an amount of at least 10% by weight based on the weight of the dispersant salt composition.

6. The aqueous dispersion as claimed in claim 1, wherein the hydrocarbon-based substituent is derived from an olefilic polymer or chlorinated analog thereof.

7. The aqueous dispersion as claimed in claim 1, wherein the hydrocarbon-based substituent is derived from monoolefinic monomers which are polymerizable.

8. The aqueous dispersion as claimed in claim 7, wherein the olefinic monomers are polymerized to produce olefin polymers which include poly(isobutene)s.

9. The aqueous dispersion as claimed in claim 8, wherein the polyolefins include polyisobutenes which have an isobutene repeating monomer unit present in an amount of about 80% based on the total number of repeating monomer units within the polymer.

10. The aqueous dispersion as claimed in claim 1, wherein the polycarboxylic acid acylating agent (B1) is polyisobutenyl succinic anhydride.

11. The aqueous dispersion as claimed in claim 1, further comprising:
    a corrosion inhibitor present in sufficient amounts so as to prevent the corrosion of a metal.

12. The aqueous dispersion as claimed in claim 1, further comprising particles dispersed therein, the particles being selected from the group consisting of carbon black, pigments, fibers, fillers and combinations thereof.

13. The aqueous dispersion as claimed in claim 12, wherein the particles are particles of carbon black dispersed within the dispersion in a homogeneous phase.

* * * * *